United States Patent
Lee et al.

(10) Patent No.: US 10,002,009 B2
(45) Date of Patent: Jun. 19, 2018

(54) ELECTRONIC DEVICE PERFORMING EMULATION-BASED FORENSIC ANALYSIS AND METHOD OF PERFORMING FORENSIC ANALYSIS USING THE SAME

(71) Applicant: ELECTRONICS AND TELECOMMUNICATIONS RESEARCH INSTITUTE, Daejeon (KR)

(72) Inventors: Jae-Jin Lee, Daejeon (KR); Hyeong Uk Jang, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 44 days.

(21) Appl. No.: 15/408,210

(22) Filed: Jan. 17, 2017

(65) Prior Publication Data

US 2017/0206102 A1 Jul. 20, 2017

(30) Foreign Application Priority Data

Jan. 18, 2016 (KR) .................. 10-2016-0006079

(51) Int. Cl.
*G06F 9/455* (2018.01)
*G06F 17/30* (2006.01)
(Continued)

(52) U.S. Cl.
CPC ........ *G06F 9/455* (2013.01); *G06F 17/30979* (2013.01); *G06F 21/00* (2013.01); *G06F 9/4451* (2013.01)

(58) Field of Classification Search
CPC .. G06F 9/455; G06F 9/4451; G06F 17/30979; G06F 12/00
(Continued)

(56) References Cited

U.S. PATENT DOCUMENTS 9,185,236 B2 * 11/2015 Kim .................. H04M 15/06
2003/0078916 A1 * 4/2003 DeForeest ......... G06F 17/30893
(Continued)

FOREIGN PATENT DOCUMENTS

| KR | 10-2011-0129573 A | 12/2011 |
| KR | 10-2015-0070512 A | 6/2015 |
| KR | 101541104 B1 | 8/2015 |

OTHER PUBLICATIONS

W.Y. Choi et al., "A Trend of Smartphone Forensic Technology", 2013 Electronics and Telecommunications Trends, vol. 28, No. 3, Jun. 2013, p. 1-8.

*Primary Examiner* — Anna Deng
(74) *Attorney, Agent, or Firm* — Rabin & Berdo, P.C.

(57) ABSTRACT

An electronic device configured to perform forensic analysis on a target device includes a data extractor, an emulator, and a user data converter. The data extractor obtains, from the target device, a source file of at least one of applications installed on the target device. The data extractor obtains, from the target device, user data generated according to the least one of the applications being executed in the target device. The emulator emulates an execution of a target application installed based on the obtained source file. The user data converter converts the obtained user data having a data structure according to a database scheme of the target device into converted user data having a data structure according to a database scheme of the emulator. The emulator emulates the execution of the target application such that the target application operates using the converted user data.

10 Claims, 12 Drawing Sheets

(51) Int. Cl.
*G06F 21/00* (2013.01)
*G06F 9/445* (2018.01)
(58) Field of Classification Search
USPC .......................................................... 717/138
See application file for complete search history.

(56) References Cited

U.S. PATENT DOCUMENTS

| | | | |
|---|---|---|---|
| 2006/0155387 A1* | 7/2006 | Pieronek | G05B 19/042 |
| | | | 700/1 |
| 2009/0209250 A1* | 8/2009 | Huq | H04L 12/2697 |
| | | | 455/425 |
| 2009/0305680 A1* | 12/2009 | Swift | H04L 43/00 |
| | | | 455/414.1 |
| 2012/0166456 A1* | 6/2012 | Kim | G06F 17/30557 |
| | | | 707/754 |
| 2014/0082027 A1* | 3/2014 | Romm | G06F 9/44505 |
| | | | 707/803 |
| 2015/0212758 A1 | 7/2015 | Lee et al. | |
| 2016/0094497 A1* | 3/2016 | Javed | H04L 67/42 |
| | | | 709/206 |

* cited by examiner

ELECTRONIC DEVICE PERFORMING EMULATION-BASED FORENSIC ANALYSIS AND METHOD OF PERFORMING FORENSIC ANALYSIS USING THE SAME

CROSS-REFERENCE TO RELATED APPLICATIONS

This U.S. non-provisional patent application claims priority under 35 U.S.C. § 119 to Korean Patent Application No. 10-2016-0006079 filed on Jan. 18, 2016, in Korean Intellectual Property Office, the entire contents of which are incorporated herein by reference.

TECHNICAL FIELD

Example embodiments of the present disclosure described herein relate to a device operating electrically, and more particularly, relate to an electronic device configured to perform an emulation-based forensic analysis on a target device and a method for performing forensic analysis using the same.

DESCRIPTION OF THE RELATED ART

When a crime occurs, an investigation agency collects a variety of information to obtain an evidence related to the crime. Forensic analysis is the term that means an overall process to obtain any evidence and find any useful result from the obtained evidence by means of scientific/technical methods. Forensic analysis includes biological forensic analysis performed on a biological factor such as fingerprint and Deoxyribonucleic Acid (DNA), and electronic forensic analysis performed on an electronic factor such as a storage device and a communication device, or the like.

Especially, as many people use various types of electronic devices (e.g., a portable computer and a portable communication terminal) and smart devices and wearable devices are widely used, the electronic forensic analysis becomes a useful source for obtaining a criminal-investigation-related evidence.

As an example, a smart phone may store information on user's various activities, such as e-mail or message transmission/reception, web information search, and picture or video capturing. Accordingly, when a criminal uses a smart phone, the smart phone may store a variety of information associated with a crime. In such a case, an investigation agency may perform forensic analysis on a criminal's smart phone in order to obtain a useful evidence related to the crime.

SUMMARY

The present disclosure may provide configurations for an electronic device used to perform forensic analysis on a target device. In some example embodiments, the electronic device may reconstruct an operation of the target device by means of user data stored in the target device. To this end, the electronic device may perform an emulation-based forensic analysis.

Some example embodiments may provide an electronic device configured to perform forensic analysis on a target device. The electronic device may include a data extractor, an emulator, and a user data converter. The data extractor may obtain, from the target device, a source file of at least one of applications that are installed on the target device. The data extractor may obtain, from the target device, user data that is generated according to the least one of the applications being executed in the target device. The emulator may emulate an execution of a target application that is installed based on the obtained source file. The user data converter may convert the obtained user data having a data structure according to a database scheme of the target device into converted user data having a data structure according to a database scheme of the emulator. The emulator may emulate the execution of the target application such that the target application operates using the converted user data.

Some example embodiments may provide an electronic device configured to perform forensic analysis on a target device. The electronic device may include one or more processors and one or more memory devices. The memory devices may store data processed or to be processed by the processors. The processors may select, in response to a request from a user, at least one application from applications that are installed on the target device, install, on the memory devices, files used to execute the selected application, obtain, from the target device, user data generated when the selected application has been executed on the target device, convert the obtained user data having a data structure according to a database scheme of the target device into converted user data having a data structure according to a database scheme processed by the processors, and emulate an execution of the selected application such that the selected application operates using the installed files and the converted user data.

Some example embodiments may provide a method of performing forensic analysis on a target device by an electronic device that includes one or more processors. The method may include installing, by the processors, a target application on the electronic device based on a source file of at least one of applications that are installed on the target device, receiving, from the target device through a reception circuit of the electronic device, user data that is generated when the target application is executed on the target device, obtaining, by the processors, a list of first fields constituting a database scheme of the target device and a list of second fields constituting a database scheme processed by the processors, converting, by the processors, the received user data constituted based on the first fields into converted user data constituted based on the second fields, emulating, by the processors, an execution of the target application such that the target application operates using the converted user data, and outputting a result of the emulating through an output device connected to the electronic device.

BRIEF DESCRIPTION OF THE DRAWINGS

The above and other features and advantages will become apparent from the following description with reference to the following figures, wherein like reference numerals refer to like parts throughout the various figures unless otherwise specified, and wherein.

DETAILED DESCRIPTION OF EMBODIMENTS

All the above-mentioned features and the following description are provided to assist in the understanding of the present disclosure. That is, the present disclosure should not be construed as limited to the "example" embodiments set forth herein, and may be embodied in different forms. The following embodiments are merely examples for fully disclosing the present invention, and are described to provide the inventive concepts to those skilled in the art. Therefore, if there are many ways to implement the components of the present disclosure, it will be understood that the present disclosure may be implemented with any one of the ways or any one of the similar things thereof.

If it is mentioned that any configuration includes/comprises specific component(s) or any process includes/comprises specific operation(s) in the present disclosure, this means that other component(s) or other operation(s) may be further included. That is, the terms used herein are only intended to describe the specific example embodiments, and are not intended to limit the scope of the present disclosure. Further, the examples described that are provided to assist in the understanding of the present disclosure include their complementary embodiments.

The terms used herein have the meanings in which those skilled in the art would generally understand. The terms commonly used are to be construed as the consistent meanings in the context of the present disclosure. In addition, the terms used herein should not be interpreted in an overly ideal or formal sense unless explicitly so defined herein. Hereinafter, example embodiments of the present disclosure will be described below with reference to the attached drawings.

Figure 1:
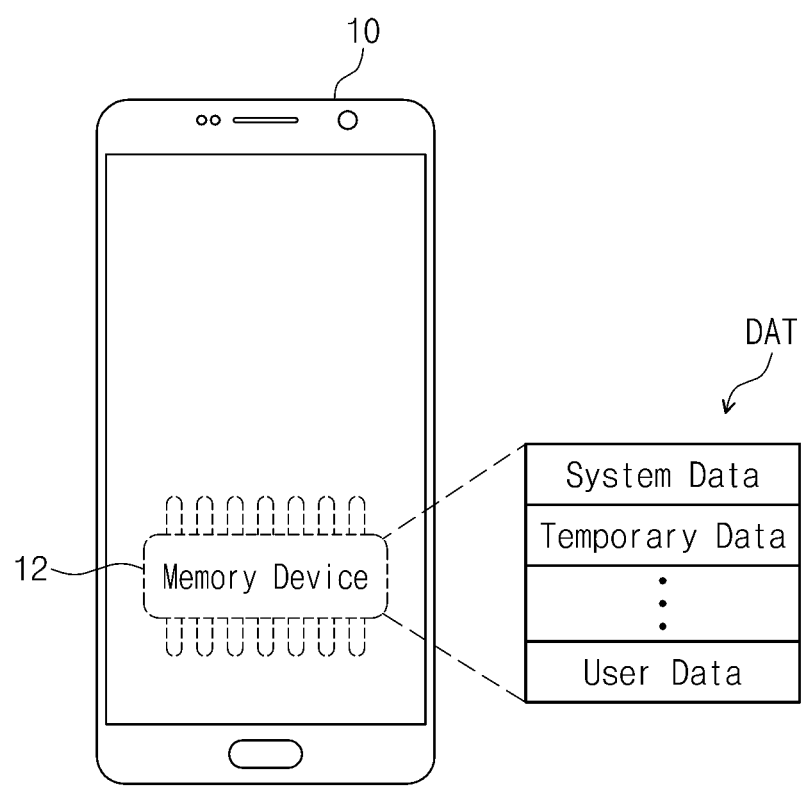
FIG. 1 is a conceptual diagram illustrating a target device (i.e., a target of forensic analysis) and data stored therein.

FIG. 1 is a conceptual diagram illustrating a target device (i.e., a target of forensic analysis) and data stored therein.

A target device 100 may be a device configured to perform communication and data processing. For example, the target device 10 may include a mobile communication device. For example, the target device 10 may be a smart phone. For another example, the target device 10 may include a portable device such as a laptop computer, a tablet computer, a wearable device, or the like. Alternatively, the target device 10 may include a computing device such as a desktop computer, a database server, a workstation, or the like.

In the following descriptions, to help better understanding, it will be assumed that the target device 10 is a smart phone. However, such an assumption is provided to help better understanding and does not limit the present disclosure. A type of the target device 10 may be changed or modified variously.

The target device 10 may be a target of forensic analysis. For example, an investigation agency may obtain the target device 10 from a criminal. The target device 10 may store information associated with user's various activities, such as e-mail or message transmission/reception, web information search, picture or video capturing, and/or the like. When a criminal has used the target device 10, the target device 10 may store a variety of information associated with a crime. An investigation agency may perform forensic analysis on the target device 10 in order to obtain a crime-related evidence from the target device 10 and search a useful result from the obtained evidence.

For example, the target device 10 may include a memory device 12. The memory device 12 may store various types of data DAT. For example, the data DAT may include system data, temporary data, and user data. The system data may include data used to operate the target device 10 (e.g., data of an operating system, data of a basic application, and/or the like). The temporary data may include data generated temporarily while the target device 10 operates. The user data may include data generated/stored by a user of the target device 10.

However, the above examples are provided to help better understanding. The data DAT may further include a different type of data. Alternatively, the data DAT may not include at least one of the system data, the temporary data, and/or the user data. A configuration of the data DAT may be changed or modified variously.

For example, the memory device 12 may include at least one nonvolatile memory and/or at least one volatile memory to store data. For example, the memory device 12 may include a nonvolatile memory such as a flash memory, a magneto-resistive random access memory (MRAM), a phase-change RAM (PRAM), and/or the like. For example, the memory device 12 may include a volatile memory such as a static RAM (SRAM), a dynamic RAM (DRAM), a synchronous DRAM (SDRAM), and/or the like.

FIG. 1 illustrates that the memory device 12 is included in the target device 10. However, in some cases, the memory device 12 may include an external device that is provided separately from the target device 10 and is connected to the target device 10 to be used. For example, the external device may include a storage device such as a hard disk Drive (HDD), a solid state drive (SSD), and/or the like. A configuration of the memory device 12 may be changed or modified variously.

As described above, when a criminal has used the target device 10, the target device 10 may store a variety of information associated with a crime. In some cases, a criminal may intentionally damage the target device 10 to conceal the crime before an investigation agency obtains the target device 10 from the criminal. In such a case, the target device 10 may not operate normally.

Various methods may be provided to perform forensic analysis on the damaged target device 10. For example, an investigation agency may extract binary data strings from memory areas of the memory device 12, and may perform text-based analysis by means of the extracted binary data strings. The investigation agency may collect a crime-related evidence based on a result of the text-based analysis. However, the text-based analysis may require a lot of time, and it may be difficult to identify an original form of the data DAT stored in the memory device 12.

For another example, the investigation agency may separate the memory device 12 from the target device 10, and then may connect the memory device 12 to a new device of the same type/model as the target device 10. Afterwards, the investigation agency may reconstruct an operation based on the data DAT stored in the memory device 12 by means of the new device. According to such a method, the original form of the data DAT stored in the memory device 12 may be identified. However, cost may be required to purchase a new device, and it may be technically difficult to separate and connect the memory device 12.

According to the example embodiments, regardless of the type of the target device 10, an operation of the target device 10 may be reconstructed using the data DAT stored in the memory device 12. To this end, the example embodiments may employ "emulation-based forensic analysis". According to the example embodiments, an original situation where the data DAT has been generated may be reconstructed, thus forensic analysis may be performed accurately and fast. Furthermore, forensic analysis may be performed easily at low cost. Example embodiments will be described in more detail with reference to FIGS. 2 to 12.

Figure 2:
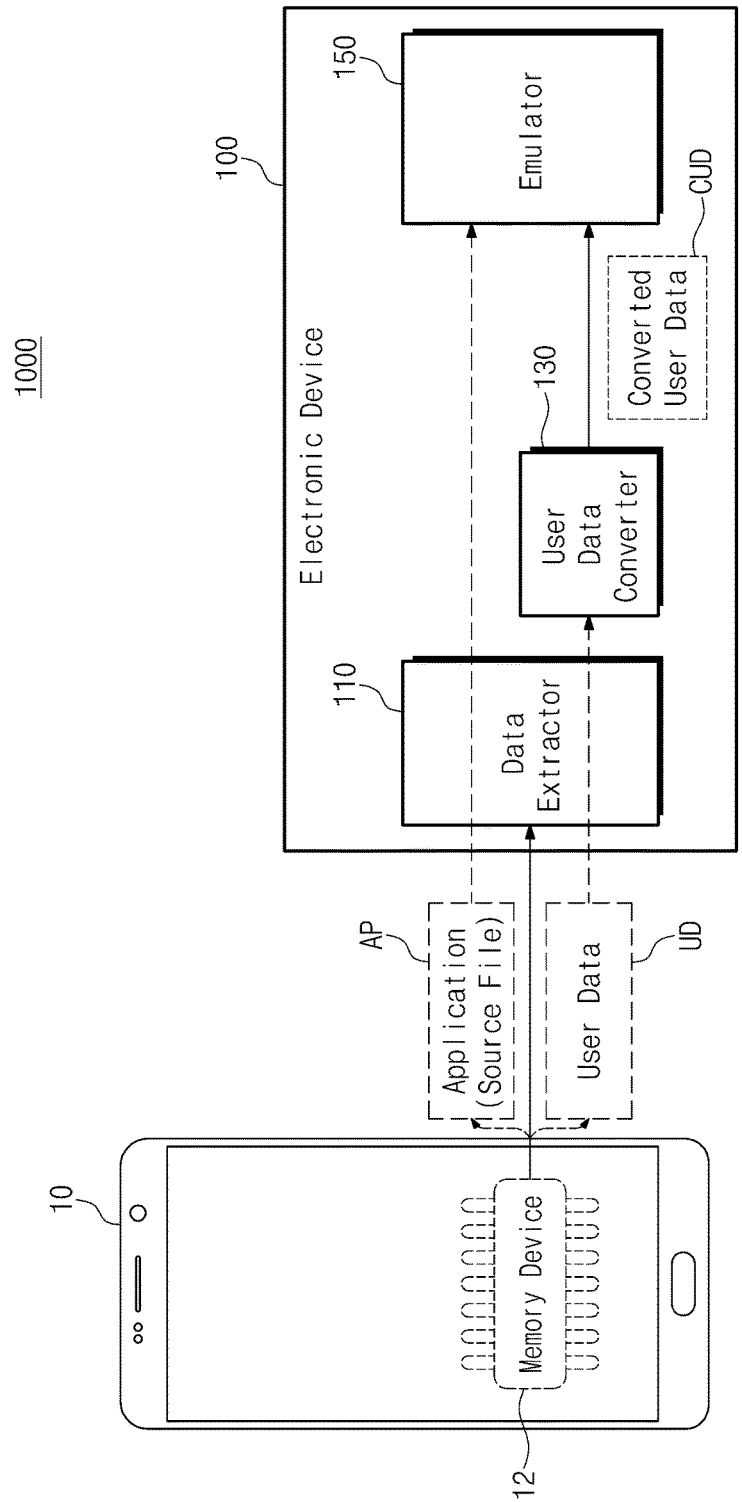
FIG. 2 is a block diagram illustrating a forensic system that includes an electronic device according to some example embodiments.

FIG. 2 is a block diagram illustrating a forensic system that includes an electronic device according to some example embodiments. A forensic system 1000 may include a target device 10 and an electronic device 100.

The target device 10 may include a memory device 12. The target device 10 may be a target of forensic analysis. Since the target device 10 and the memory device 12 have been described with reference to FIG. 1, redundant descriptions will be omitted below for brevity.

The electronic device 100 may be configured to perform forensic analysis on the target device 10. The electronic device 100 may be used to collect a crime-related evidence from the target device 10. The electronic device 100 may be configured to perform various logical operations/arithmetic operations and process data to perform forensic analysis. To this end, the electronic device 100 may be implemented to include a circuit, a chip, a device, and/or a system with computing power.

For example, the electronic device 100 may be implemented to include at least one special-purpose logic circuit (e.g., field programmable gate array (FPGA), application specific integrated circuits (ASICs), and/or the like) designed to perform forensic analysis. Components of the electronic device 100 described below may be designed in a hardware form (e.g., a special-purpose logic circuit) to perform any intended function(s).

For another example, the electronic device 100 may be implemented with a device including at least one processor core that has computing power (e.g., a personal computer, a laptop computer, a tablet computer, a smart phone, and/or the like). The processor core may identify and process an instruction set included in a machine-executable program code. Components of the electronic device 100 described below may be designed in a software form (e.g., a program code) to perform any intended function(s), and may be processed by a processor core.

For still another example, the electronic device 100 may be designed in a hybrid form. That is, some components of the electronic device 100 may be designed in a hardware form, while some other components of the electronic device 100 may be designed in a software form. A design of components in the electronic device 100 may be changed or modified variously.

In some example embodiments, the electronic device 100 may include a data extractor 110, a user data converter 130, and an emulator 150. As described above, each of the data extractor 110, the user data converter 130, and the emulator 150 may be designed in a hardware form, a software form, and a hybrid form.

The data extractor 110 may extract data stored in the target device 10. More specifically, the data extractor 110 may obtain data stored in the memory device 12. To this end, the data extractor 110 may be directly or indirectly connected to the memory device 12, and may communicate with the memory device 12.

For example, the data extractor 110 may communicate with the memory device 12 through a communication terminal or connector (not shown) that is included in the electronic device 100. For example, the data extractor 110 may communicate with the memory device 12 in compliance with various communication protocols, such as universal serial bus (USB), serial advanced technology attachment (SATA), integrated drive electronics (IDE), peripheral component interconnect express (PCIe), and/or the like. The electronic device 100 and/or the data extractor 110 may include a transmission/reception circuit (not shown) to perform communication.

For example, when the target device 10 is a smart phone, the memory device 12 may store application data AP associated with one or more applications that are installed on the target device 10. An application (or also called as app) may mean a program executed on the target device 10 to provide service to a user.

The application data AP may include execution files and source files of the applications. The execution files may include files used to execute the applications, and the source files may include files used to install the applications on the target device 10. In some cases, the target device 10 may manage a list of the applications installed thereon, and the application data AP may include data corresponding to the list of the applications.

Furthermore, the memory device 12 may store user data UD. The user data UD may include data that is generated when the applications are executed on the target device 10. For example, the user data UD may include data that is generated and stored by a user of the target device 10, such as a phone call list, a web page stored while a web browser application is executed, an e-mail transmitted/received by a user, a picture or a video, a voice file stored while a recorder application is executed, a message transmitted/received while a messenger application is executed, and/or the like. However, the present disclosure is not limited thereto, and the user data UD may further include other types of data and other applications may be further provided.

The user data UD may include data that is useful to investigate a crime. Accordingly, the data extractor 110 may obtain the user data UD, which has been generated according to executing at least one of the applications on the target device 10, from the target device 10. For example, the user data UD may be received through a reception circuit of the data extractor 110.

Meanwhile, an application related to the user data UD may be required to reconstruct an original situation where the user data UD was generated. Accordingly, the data extractor 110 may obtain the application data AP from the target device 10 to reconstruct an operation of the target device 10 based on the user data UD.

As shown in FIG. 2, in some example embodiments, the data extractor 110 may obtain a source file of at least one of the applications that are installed on the target device 10. The obtained source file may be used to directly installing an application on the electronic device 100 and then to reconstruct an operation of the target device 10.

Alternatively, in some example embodiments, the data extractor 110 may obtain a list of the applications that are installed on the target device 10, instead of directly obtaining a source file. In such example embodiments, the data extractor 110 may obtain a source file of an application from a memory device or a storage device other than the memory device 12. Such example embodiments will be described with reference to FIG. 5.

In some example embodiments, the data extractor 110 may obtain the entirety of the application data AP and the user data UD. Alternatively, the data extractor 110 may obtain only application data AP associated with some applications selected from among the applications installed on the target device 10, and user data UD for the selected applications. The obtaining operation of the data extractor 110 may be changed or modified variously according to the purpose, target, and/or scope of forensic analysis. Selecting an application will be described with reference to FIG. 4.

The user data converter 130 may convert a data structure of the user data UD. In most of cases, a database scheme managed in the target device 10 may be different from a database scheme managed in the electronic device 100. This is because a database scheme managed in the target device 10 may be modified depending on the manufacturer, model, function, and/or performance of the target device 10.

Accordingly, the user data converter 130 may convert the data structure of the user data UD such that the data structure of the user data UD becomes suitable for the electronic device 100. Thus, the user data converter 130 may generate the converted user data CUD. When the user data converter 130 is employed, the user data UD may be used appropriately based on the database scheme managed in the electronic device 100, regardless of the model of the target device 10 (that is, regardless of the database scheme managed in the target device 10).

The user data converter 130 may convert the user data UD having a data structure according to the database scheme of the target device 10, and thus may generate the converted user data CUD having a data structure according to a database scheme of the electronic device 100 (more specifically, a database scheme of the emulator 150). Converting a data structure will be described in more detail with reference to FIGS. 6 to 9.

The emulator 150 may imitate (that is, emulate) an operation of the target device 10. To this end, the emulator 150 may be designed based on models of hardware circuits/modules included in the target device 10. For example, the emulator 150 may emulate operations processed/performed in a processor, a memory, an input/output line, and/or the like, included in the target device 10. Accordingly, the emulator 150 may provide an operation environment which is identical or similar to an operation environment of the target device 10.

In the example embodiments, the emulator 150 may be designed based on models of common hardware circuits/modules that are not related to any specific type/model of the target device 10. Thus, according to the example embodiments, the dependency on the type/model of the target device 10 may be resolved. As a result, the converted user data CUD having a converted data structure may be used appropriately.

As described above, the data extractor 110 may be employed to obtain a source file of at least one of the applications that are installed on the target device 10. The source file may be obtained from the memory device 12 or from other memory/storage device(s). The application of the obtained source file may be installed on the electronic device 100 based on the obtained source file to operate on the emulator 150. In the following descriptions, the application installed on the electronic device 100 may also be referred to as a "target application". The target application may be selected from among the applications that are installed on the target device 10.

The emulator 150 may emulate the execution of the target application. The emulator 150 may execute the target application on the models of hardware circuits/modules included in the target device 10. Accordingly, the emulator 150 may emulate the execution of the target application under an operation environment which is identical or similar to an operation environment of the target device 10.

In the example embodiments, the emulator 150 may operate based on the target application installed based on a source file, and the converted user data CUD. The emulator 150 may emulate the execution of the target application such that the target application operates using the converted user data CUD. Accordingly, the execution of the target application may be emulated in the emulator 150 to be identical or similar to a case where the target application is executed on the target device 10.

In some example embodiments, the emulator 150 may output a result of the emulation. For example, the emulator 150 may reconstruct an operation of the target device 10 by emulating the execution of the target application based on the converted user data CUD. The emulator 150 may output the reconstructed operation of the target device 10 through an output device (not shown). Reconstructing an operation of the target device 10 will be described with reference to FIG. 10.

In some example embodiments, the emulator 150 may collect data associated with an event of interest that occurs while the execution of the target application is emulated. The event of interest may include an event in which a user of the electronic device 100 is interested. For example, an investigation agency may be interested in a crime-related word or picture, and the event of interest may include a specific word or a specific image. The event of interest will be described in more detail with reference to FIG. 11.

Figure 3:
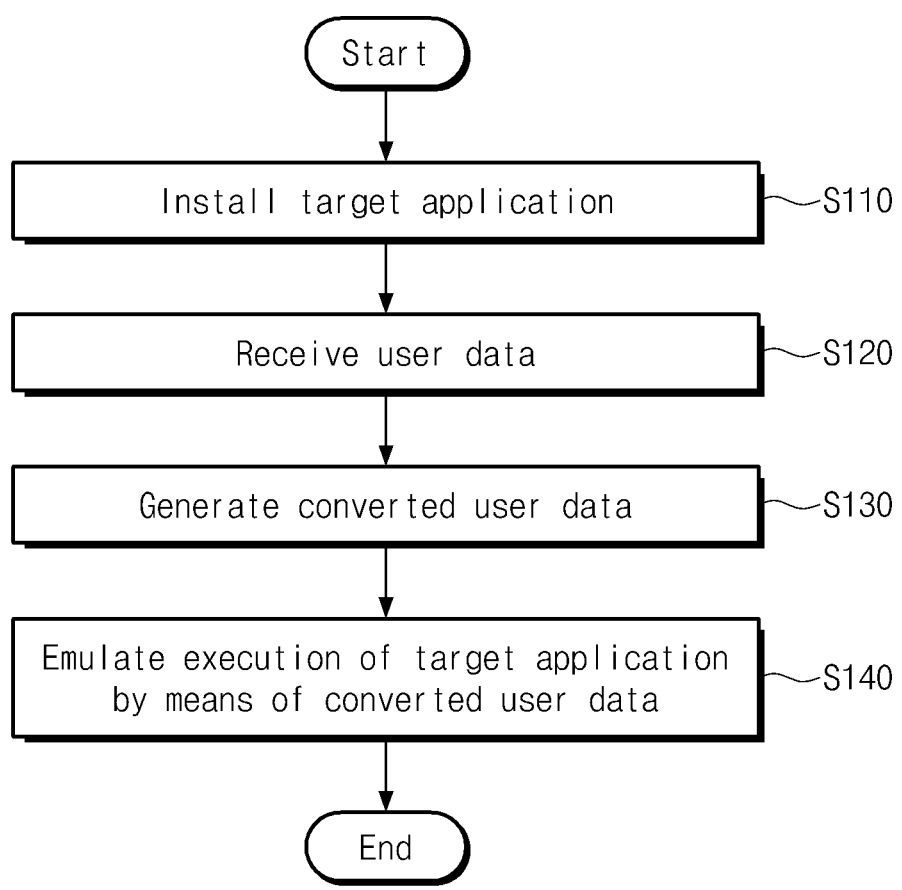
FIG. 3 is a flowchart describing a process of performing forensic analysis on a target device of FIG. 2 by means of an electronic device of FIG. 2.

FIG. 3 is a flowchart describing a process of performing forensic analysis on a target device of FIG. 2 by means of an electronic device of FIG. 2. FIG. 2 will be referred together with FIG. 3 to help better understanding.

In operation S110, a target application may be installed on an electronic device 100. The target application may be selected from among applications that are installed on the target device 10. The data extractor 110 may communicate with the target device 10 to recognize a list of the applications that are installed on the target device 10. The target application may be installed based on a source file that is used to install the target application. Accordingly, files used to execute the target application may be installed on the electronic device 100. The source file may be obtained from the memory device 12 and/or other memory/storage device(s).

In operation S120, the electronic device 100 may receive user data UD from the memory device 12 by means of the data extractor 110. The user data UD may include data generated when the target application was executed on the target device 10. The user data UD received in operation S120 may have a data structure according to a database scheme of the target device 10.

In operation S130, the electronic device 100 may convert the data structure of the user data UD by means of the user data converter 130. Thereby, the user data converter 130 may generate converted user data CUD. The converted user data CUD may have a data structure according to a database scheme of the emulator 150. According to operation S130, the dependency on the model/type of the target device 10 may be resolved.

FIG. 3 describes that operation S110 is performed before operations S120 and S130 are performed. However, the present disclosure is not limited to FIG. 3. In some example embodiments, operation S110 may be performed after operations S120 and S130 are performed. Alternatively, operation S110 may be performed in parallel (e.g., concurrently or simultaneously) with operations S120 and S130.

In operation S140, the electronic device 100 may emulate an execution of the target application by means of the emulator 150. The emulator 150 may execute the target application based on the files installed in operation S110 and the converted user data CUD generated in operation S130. Accordingly, the emulator 150 may emulate the execution of the target application under an operation environment which is identical or similar to an operation environment of the target device 10.

For example, a criminal may transmit/receive crime-related messages by means of the target device 10. An investigation agency may select a messenger application as a target application, and may obtain the user data UD that includes the messages transmitted/received by the target device 10. Then, the messenger application may be installed on the electronic device 100, and the emulator 150 may emulate the execution of the messenger application based on the converted user data CUD that is converted from the user data UD. Accordingly, an original situation where the messages were transmitted/received by the target device 10 may be reconstructed.

A result of such emulation may provide useful information for investigating a crime. Because an original situation where the user data UD was generated may be reconstructed, forensic analysis may be performed accurately and fast. Furthermore, forensic analysis may be performed regardless of the model/type of the target device 10.

However, the above examples are provided to help better understanding and do not limit the present disclosure. Obtaining the user data UD and emulating the execution of the target application may be changed or modified variously according to the purpose, target, and/or scope of forensic analysis.

Figure 4:
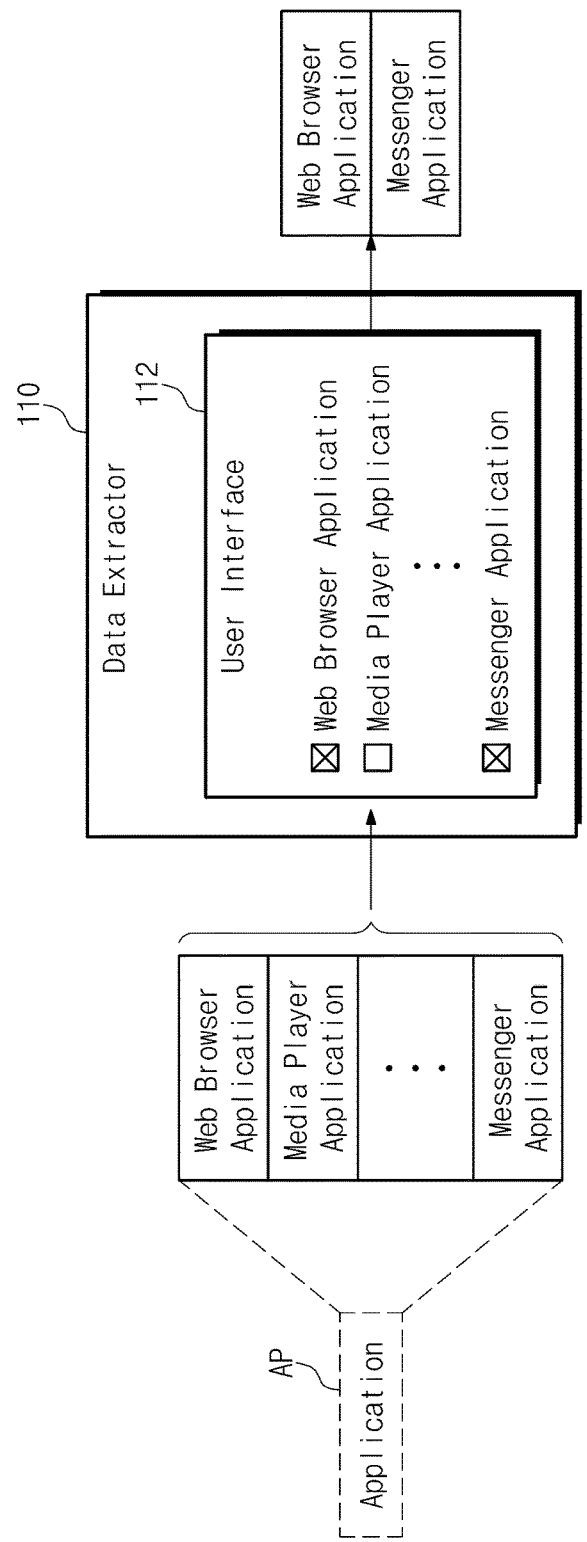
FIG. 4 is a conceptual diagram illustrating a user interface included in a data extractor of FIG. 2.

FIG. 4 is a conceptual diagram illustrating a user interface included in a data extractor of FIG. 2. FIG. 2 will be referred together with FIG. 4 to help better understanding.

Various types of applications may be installed on the target device 10. For example, these applications may include a web browser application, a media player application, a messenger application, and/or the like. However, the present disclosure is not limited to this example, and other types of applications may be further provided.

Application data AP may include data associated with an application installed on the target device 10. For example, the application data AP may include data associated with a list of the applications installed on the target device 10. For example, the application data AP may include source files of the applications installed on the target device 10.

In some example embodiments, the data extractor 110 may include a user interface 112. The user interface 112 may be provided to select the target application from among the applications that are installed on the target device 10. A user (e.g., an investigation agency) of the electronic device 100 may interface with the data extractor 110 through the user interface 112. The user interface 112 may output information to a user of the electronic device 100, and may receive an input from a user of the electronic device 100.

For example, the user interface 112 may include a display device (not shown). The data extractor 110 may obtain a list of the applications installed on the target device 10, and the user interface 112 may output the obtained list on the display device. For example, the user interface 112 may include another type of an output device to provide information such as voice information, sound information, text information, and/or the like. A user of the electronic device 100 may recognize a list of the applications installed on the target device 10 through the user interface 112.

For example, a user of the electronic device 100 may select target application(s) from the list of the applications by means of an input device (not shown) such as a keyboard, a mouse, a touch screen, and/or the like. The user interface 112 may receive an input from a user of the electronic device 100. The data extractor 110 may select at least one of the applications installed on the target device 10 as the target application in response to a user's request through the user interface 112. Herein, one target application may be selected or two or more target applications may be selected.

For example, the data extractor 110 may obtain a source file of the selected target application from the memory device 12. The source file obtained by the data extractor 110 may be used to install the target application on the electronic device 100 and to emulate the execution of the target application in the emulator 150. For another example, the data extractor 110 may output a list of the selected target applications. The output list may be referred to obtain a source file from another memory/storage device other than the memory device 12.

For example, an investigation agency may be interested in a webpage viewed in the target device 10 and a message transmitted/received by the target device 10. In this case, an investigation agency may select a web browser application and a messenger application as target applications through the user interface 112. Afterwards, the web browser application and the messenger application may be installed on the electronic device 100, based on the source file of the web browser application and the source file of the messenger application.

In some example embodiments, the data extractor 110 may not include the user interface 112. In such example embodiments, the data extractor 110 may be designed to obtain the source files of all the applications installed on the target device 10. Alternatively, the data extractor 110 may be designed to obtain the source files of some pre-selected applications. The example embodiments may be changed or modified variously according to the purpose, target, and/or scope of forensic analysis.

Figure 5:
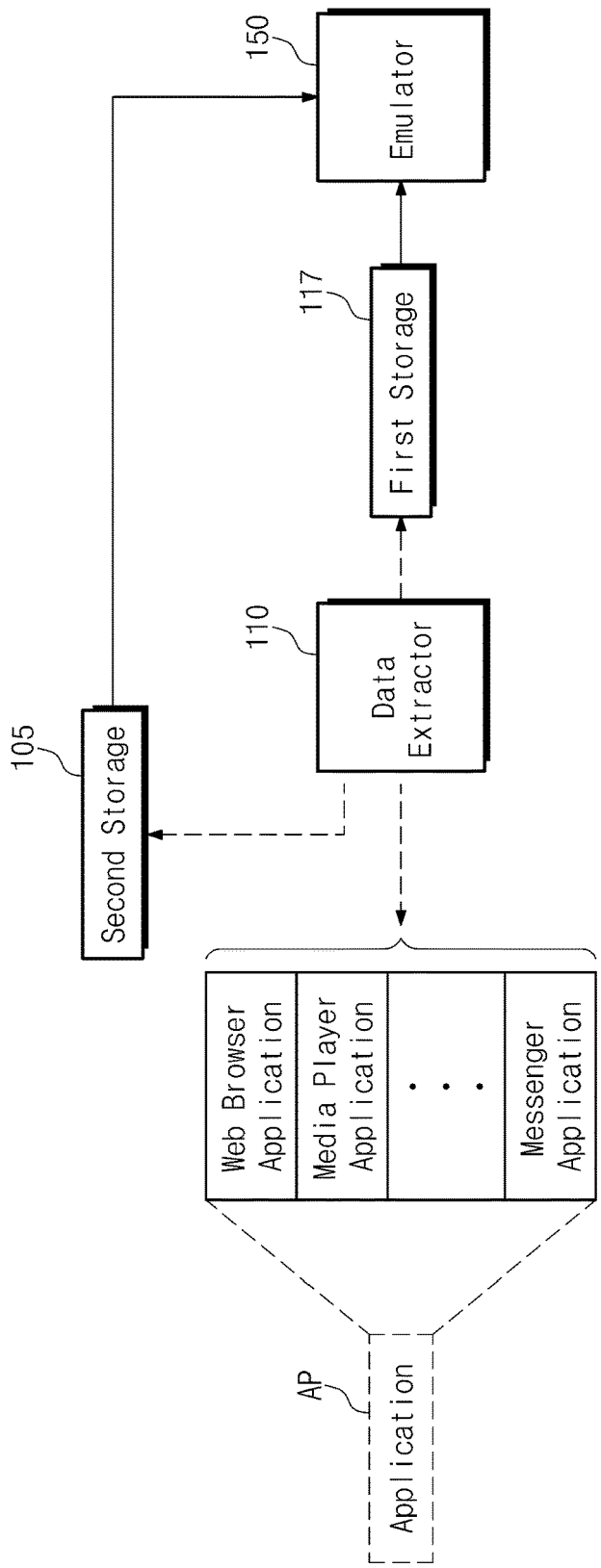
FIG. 5 is a conceptual diagram illustrating an example process of installing an application on an electronic device of FIG. 2 by a data extractor of FIG. 2.

FIG. 5 is a conceptual diagram illustrating an example process of installing an application on an electronic device of FIG. 2 by a data extractor of FIG. 2. FIG. 2 will be referred together with FIG. 5 to help better understanding.

As described with reference to FIG. 2, in some example embodiments, the data extractor 110 may directly obtain a source file of at least one of applications installed on the target device 10. Alternatively, in some example embodiments, instead of directly obtaining the source file from the target device 10, another memory/storage device other than the memory device 12 may manage source files.

For example, the first storage device 117 may be included in the electronic device 100. For example, the first storage device 117 may be a device that includes a nonvolatile memory, such as a HDD, a SSD, a secure digital (SD) card, an embedded multimedia card (eMMC), or the like.

For example, the second storage device 105 may be provided separately from the electronic device 100. For example, the second storage device 105 may be a device that is not included in the electric device 100, such as an external storage device, a storage server, a cloud storage, or the like.

At least one of the first storage device 117 and the second storage device 105 may store the source files of the applications that are installable on the target device 10. For example, the first storage device 117 and the second storage device 105 may store source files of all kinds of known applications. For example, the first storage device 117 and the second storage device 105 may store source files of some applications that are useful to investigate a crime. The present disclosure is not limited to the above examples, and the source files stored in the first storage device 117 and the second storage device 105 may be changed or modified variously.

For example, the data extractor 110 may obtain a list of the applications installed on the target device 10, based on the application data AP. The data extractor 110 may provide the obtained list to the first storage device 117 and/or the second storage device 105.

At least one of the first storage device 117 and/or the second storage device 105 may output the source file(s) of application(s) corresponding to the received list. Based on the source file output from the first storage device 117 and/or the second storage device 105, files used to execute the target application may be installed on the electronic device 100. The emulator 150 may emulate the target application executed based on the installed files.

Figure 6:
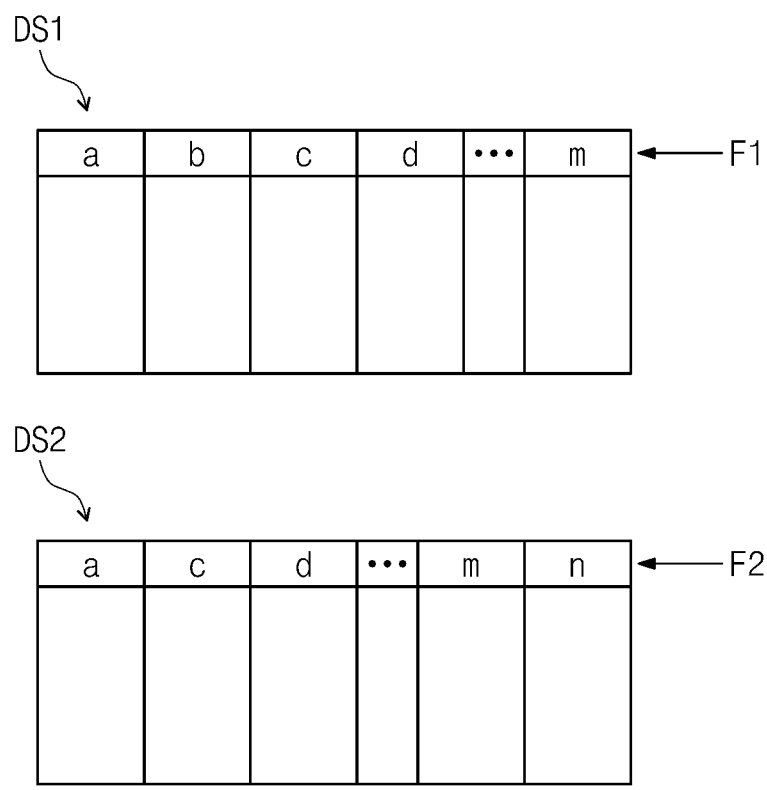
FIG. 6 is a conceptual diagram illustrating a database scheme for a target device of FIG. 2 and a database scheme for an electronic device of FIG. 2.

FIG. 6 is a conceptual diagram illustrating a database scheme for a target device of FIG. 2 and a database scheme for an electronic device of FIG. 2.

For example, FIG. 6 illustrates a first database scheme DS1 and a second database scheme DS2. To help better understanding, it will be assumed that the first database scheme DS1 is a database scheme managed in the target device 10 of FIG. 2 and the second database scheme DS2 is a database scheme managed in the electronic device 100 of FIG. 2 (more specifically, the emulator 150 of FIG. 2).

The database scheme may mean a data configuration designed to manage data stored in a database. Data stored in a database may have a data structure according to a database scheme.

The data stored in a database may be managed based on a "field". For example, the first database scheme DS1 may be constituted based on first fields F1, and the second database scheme DS2 may be constituted based on second fields F2.

For example, the first fields F1 may include m fields (e.g., a field "a", a field "b", a field "c", a field "d", and a field "m"). For example, when the first database scheme DS1 is configured to manage data of messages transmitted/received by a messenger application, the field "a" may correspond to an identifier of a message, and the field "b" may correspond to a time when the message was generated. For example, the field "c" may correspond to a date when the message was generated, and the field "d" may correspond to an identifier of a transmitter who transmits the message. For example, in the target device 10, the messenger application may operate based on message data that has a data structure according to the first database scheme DS1.

Each of the fields included in the first fields F1 may be selected to identify and manage data of each message. Each of the fields included in the first fields F1 is not limited to the above examples, and may be changed or modified variously depending on a design of the first data base scheme DS1.

For example, the second fields F2 may include n fields (e.g., a field "a", a field "c", a field "d", a field "m", and a field "n"). Each of fields included in the second fields F2 may be selected to identify and manage data managed based on the second database scheme DS2. Each of the fields included in the second fields F2 may be changed or modified variously depending on a design of the second data base scheme DS2.

As described with reference to FIG. 2, the first database scheme DS1 may be different from the second database scheme DS2. This is because a database scheme may be modified based on various factors, such as a type, a function, and/or the like, of a device. For example, referring to FIG. 6, the field "a", the field "c", the field "d", and the field "m" may be included in both the first database scheme DS1 and the second database scheme DS2. On the other hand, the field "b" may be included in only the first database scheme DS1, and the field "n" may be included in only the second database scheme DS2.

The first database scheme DS1 may be managed by the target device 10 of FIG. 2, and accordingly, the user data UD of FIG. 2 may have a data structure according to the first database scheme DS1. When the first database scheme DS1 is different from the second database scheme DS2, the user data UD may not be used in the electronic device 100 of FIG. 2. This is because the user data UD does not have a database scheme managed in the electronic device 100 (i.e., the second database scheme DS2). If the user data UD is used in the electronic device 100 of FIG. 2, the electronic device 100 may not operate using the user data UD or an error may occur during an operation of the electronic device 100.

Accordingly, the user data converter 130 of FIG. 2 may convert the user data UD to generate the converted user data CUD. The converted user data CUD may have a data structure according to the second database scheme DS2. The converted user data CUD may be used in the electronic device 100. Converting a data structure will be described in more detail with reference to FIGS. 7 to 8.

Figure 7:
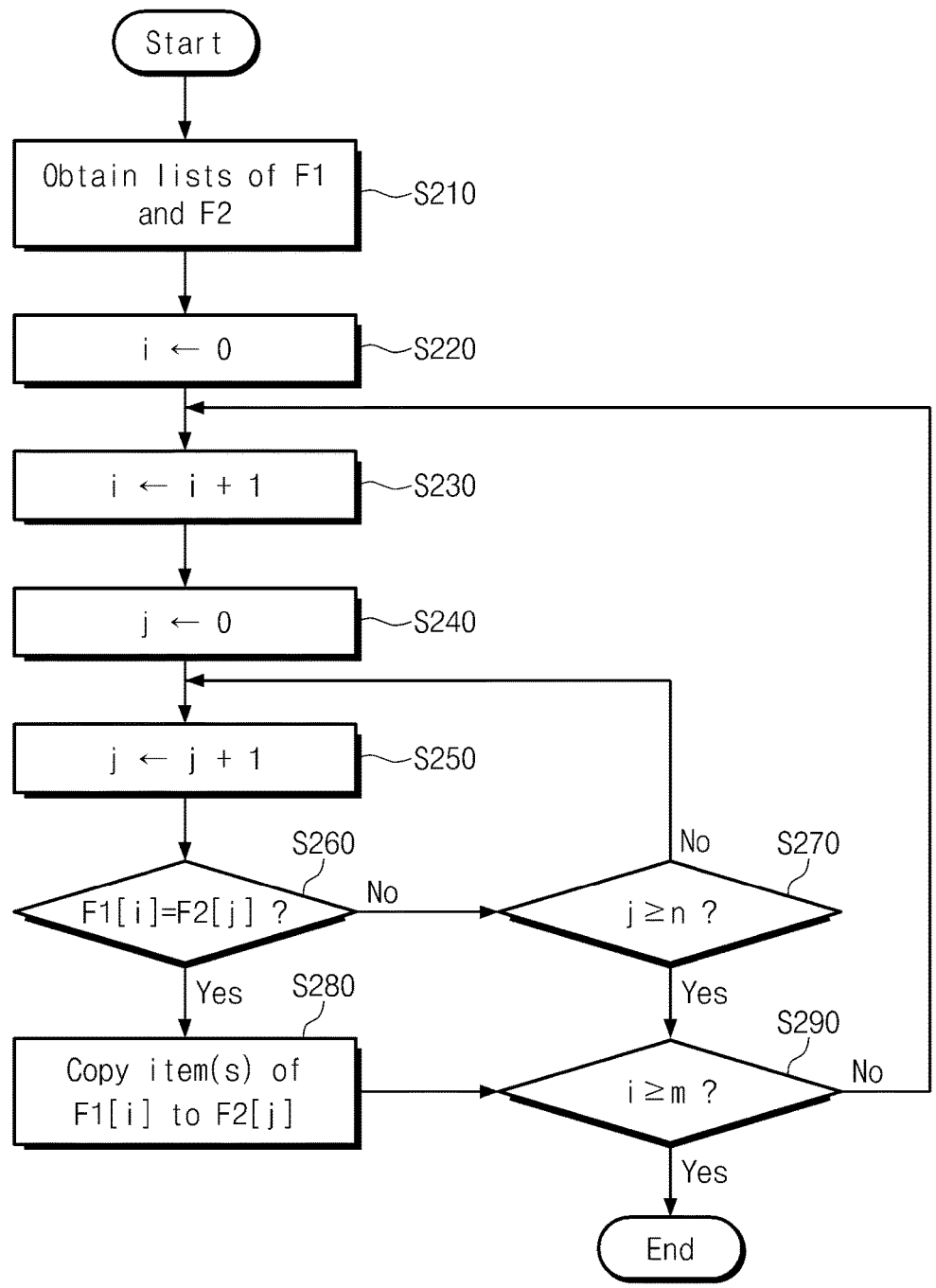
FIG. 7 is a flowchart describing a process of converting a data structure of user data by a user data converter of FIG. 2.
Figure 8:
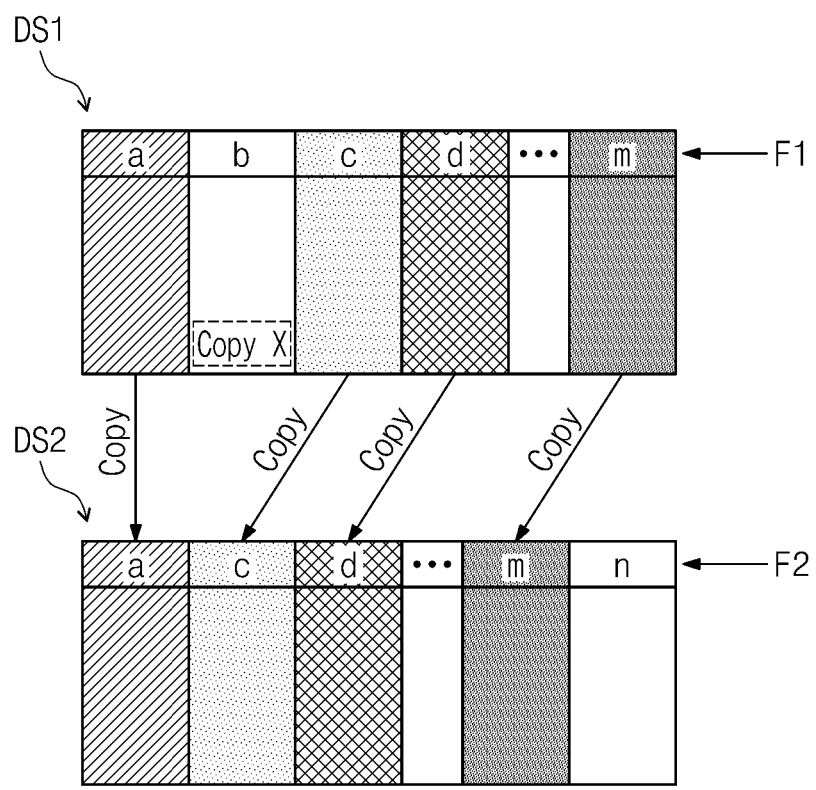
FIG. 8 is a conceptual diagram illustrating a process of converting a data structure of user data by a user data converter of FIG. 2.

FIG. 7 is a flowchart describing a process of converting a data structure of user data by a user data converter of FIG. 2. FIG. 8 is a conceptual diagram illustrating a process of converting a data structure of user data by a user data converter of FIG. 2. FIG. 2 will be referred together with FIGS. 7 and 8 to help better understanding.

Referring to FIG. 7, in operation S210, the user data converter 130 may obtain a list of first fields F1 constituting a first database scheme DS1 and a list of second fields F2 constituting a second database scheme DS2. For example, the user data converter 130 may obtain the list of the first fields F1 by analyzing the user data UD obtained through the data extractor 110. For example, the user data converter 130 may obtain the list of the second fields F2 based on information associated with a design of the electronic device 100 and/or the emulator 150 (e.g., a specification or a manual of the electronic device 100 or the emulator 150). Alternatively, the user data converter 130 may obtain the list of the second fields F2 by analyzing data processed in the electronic device 100 and/or the emulator 150.

Referring to FIG. 8, the user data converter 130 may recognize that the first fields F1 include m fields (e.g., a field "a", a field "b", a field "c", a field "d", and a field "m").

Furthermore, the user data converter 130 may recognize that the second fields F2 include n fields (e.g., a field "a", a field "c", a field "d", a field "m", and a field "n").

Referring to FIG. 7, in operation S220, the user data converter 130 may set (e.g., initialize) a value of a variable "i" to zero (0). Herein, the variable "i" may denote the index of a field included in the first fields F1. For example, in the first database scheme DS1 of FIG. 8, the first index (i.e., i=1) may correspond to the field "a", the second index (i.e., i=2) may correspond to the field "b", and the $m^{th}$ index (i.e., i=m) may correspond to the field "m". Afterwards, in operation S230, the user data converter 130 may increase the value of the variable "i" by 1.

In operation S240, the user data converter 130 may set (e.g., initialize) a value of a variable "j" to zero (0). Herein, the variable "j" may denote the index of a field included in the second fields F2. For example, in the second database scheme DS2 of FIG. 8, the first index (i.e., j=1) may correspond to the field "a", the second index (i.e., j=2) may correspond to the field "c", and the $n^{th}$ index (i.e., j=n) may correspond to the field "n". Afterwards, in operation S250, the user data converter 130 may increase the value of the variable "j" by 1.

In operation S260, the user data converter 130 may determine whether the $i^{th}$ field F1[i] of the first fields F1 is identical to the $j^{th}$ field F2[j] of the second fields F2. For example, referring to FIG. 8, when the value of the variable "i" is 1 and the value of the variable "j" is 1, the user data converter 130 may determine whether the field "a", which is the first field F1[1] of the first fields F1, is identical to the field "a", which is the first field F2[1] of the second fields F2.

When it is determined that the two fields are identical in operation S260 of FIG. 7, operation S280 may be performed. In operation S280, the user data converter 130 may copy item(s) of the $i^{th}$ field F1[i] of the first fields F1 to the $j^{th}$ field F2[j] of the second fields F2. In some example embodiments, the user data converter 130 may include a memory area for storing the item(s). Alternatively, the user data converter 130 may use other memory area included in the electronic device 100 to store the item(s).

For example, referring to FIG. 8, the user data converter 130 may determine that the field "a" of the first data scheme DS1 is identical to the field "a" of the second database scheme DS2. Accordingly, the user data converter 130 may copy item(s) of the field "a" of the first data scheme DS1 to the field "a" of the second database scheme DS2.

Referring back to FIG. 7, in operation S290 after the copy operation, the user data converter 130 may determine whether the value of the variable "i" is greater than or equal to m. That is, the user data converter 130 may determine whether copy operations of operation S280 are completed for all the m fields included in the first fields F1.

When it is determined that the value of the variable "i" is less than m (i.e., when it is determined that copy operations of operation S280 are not completed yet) in operation S290, operation S230 may be performed. In operation S230, the user data converter 130 may increase the value of the variable "i" by 1. Accordingly, the user data converter 130 may prepare to process the field "b" following the field "a" in the first fields F1. Afterwards, in operation S240, the value of the variable "j" may be initialized to zero (0) again.

In operation S250, the user data converter 130 may increase the value of the variable "j" by 1. In operation S260, the user data converter 130 may determine whether the $i^{th}$ field F1[i] of the first fields F1 is identical to the $j^{th}$ field F2[j] of the second fields F2. For example, referring to FIG. 8, when the value of the variable "i" is 2 and the value of the variable "j" is 1, the user data converter 130 may determine whether the field "b", which is the second field F1[2] of the first fields F1, is identical to the field "a", which is the first field F2[1] of the second fields F2.

When it is determined that the two fields are different in operation S260 of FIG. 7, operation S270 may be performed. In operation S270, the user data converter 130 may determine whether the value of the variable "j" is greater than or equal to n. That is, the user data converter 130 may determine whether comparison operations of operation S260 are completed for all the n fields included in the second fields F2.

When it is determined that the value of the variable "j" is less than n (i.e., when it is determined that comparison operations of operation S260 are not completed yet) in operation S270, operation S250 may be performed. In operation S250, the user data converter 130 may increase the value of the variable "j" by 1. Accordingly, the user data converter 130 may prepare to process the field "c" following the field "a" in the second fields F2.

As operations S250, S260, and S270 are repeated, the user data converter 130 may determine whether the field "b" of the first fields F1 is identical to each and every field of the second fields F2. However, referring to FIG. 8, the field "b" may not be included in the second database scheme DS2. Accordingly, when operations S250, S260, and S270 are repeated n times (i.e., when the field "b" of the first fields F1 is compared to each of all the n fields of the second fields F2) while the value of the variable "i" is 2, the user data converter 130 may determine that the value of the variable "j" is n in operation S270. In such a case, the user data converter 130 may determine whether the value of the variable "i" is greater than or equal to m in operation S290. When the value of the variable "i" is not greater than or equal to m, operation S230 may be performed again.

When it is determined that compared two fields are different in operation S260 of FIG. 7, operation S280 may not be performed. Accordingly, when the second database scheme DS2 does not include a field that is identical to a specific field of the first database scheme DS1, the specific field of the first database scheme DS1 may not be copied to the second database scheme DS2. For example, referring to FIG. 8, when the second fields F2 do not include the field "b", the item(s) of the field "b" of the first fields F1 may not be copied to the second database scheme DS2.

In such a manner, each of m fields included in the first fields F1 may be compared to each of the n fields included in the second fields F2 in operation S260. When a specific field of the first fields F1 is included in the second fields F2, the item(s) of the specific field may be copied to a corresponding field of the second database scheme DS2 in operation S280. On the other hand, when a specific field of the first fields F1 is not included in the second fields F2, the item(s) of the specific field may not be copied to the second database scheme DS2. Such operations may be repeated until all fields of the first database scheme DS1 are processed by operations S270 and S290.

For example, referring to FIG. 8, the field "c", the field "d", and the field "m" of the first database scheme DS1 may be included in the second database scheme DS2. Accordingly, the user data converter 130 may copy the items of the field "c", the field "d", and the field "m" of the first database scheme DS1 to the field "c", the field "d", and the field "m" of the second database scheme DS2.

When all them fields of the first fields F1 are processed according to a method of FIG. 7, a conversion process performed by the user data converter 130 may be terminated.

According to such the conversion process, the second database scheme DS2 managed by the electronic device 100 (more specifically, the emulator 150) may be obtained, and the converted user data CUD may have a data structure according to the second database scheme DS2.

To sum up, in the example embodiments, the user data converter 130 may convert the user data UD constituted based on the first fields F1 into the converted user data CUD constituted based on the second fields F2. In some cases, a security attribute may be assigned to prevent the use data UD from being modified. In such cases, during the conversion process, changing the security attribute may be required.

For example, the user data converter 130 may generate the converted user data CUD such that the converted user data CUD includes item(s) corresponding to a field, among the m fields of the first fields F1, that is identical to one of the n fields of the second fields F2. For example, the user data converter 130 may generate the converted user data CUD such that the converted user data CUD does not include item(s) corresponding to a field, among the m fields of the first fields F1, that is not identical to all then fields of the second fields F2.

The examples described with reference to FIGS. 7 and 8 are provided to help better understanding and is not intended to limit the present disclosure. Processing conditions, such as variable setting, field configuration, operation order, and/or the like, may be changed or modified variously according to a design of a database scheme, a design of the user data converter 130, and/or a design of the electronic device 100. In some example embodiments, the conversion process performed by the user data converter 130 may be modified variously to be suitable for generating the converted user data CUD.

According to the example embodiments, the converted user data CUD may have a data structure according to the second database scheme DS2 managed in the electronic device 100. Accordingly, the converted user data CUD may be appropriately used in the electronic device 100. Furthermore, because the converted user data CUD is constituted according to the second database scheme DS2 regardless of constitution of the first database scheme DS1, the dependency on the model/type of the target device 10 may be resolved. As a result, forensic analysis may be performed easily at low cost.

Figure 9:
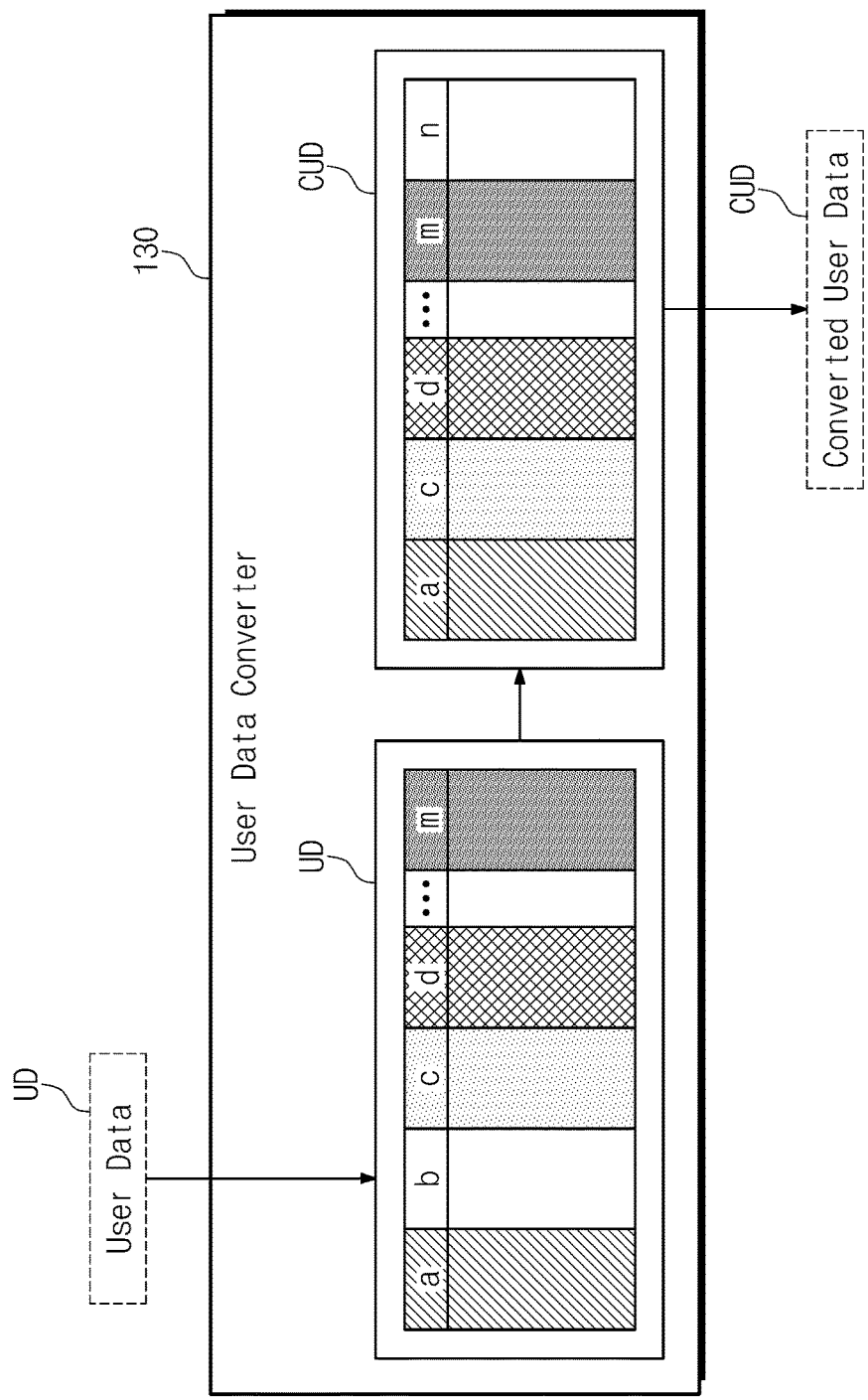
FIG. 9 is a conceptual diagram illustrating a process of generating converted user data by a user data converter of FIG. 2.

FIG. 9 is a conceptual diagram illustrating a process of generating converted user data by a user data converter of FIG. 2.

The user data UD may include data generated when a target application was executed on the target device 10 of FIG. 2. As described above, the user data UD may have a data structure according to a database scheme managed in the target device 10 (e.g., the first database scheme DS1 of FIG. 8). For example, a database scheme for the user data UD may be constituted with m fields (e.g., a field "a", a field "b", a field "c", a field "d", and a field "m").

The user data converter 130 may receive the user data UD. The user data converter 130 may convert a data structure of the user data UD to generate the converted user data CUD. As described above, the converted user data UD may have a data structure according to a database scheme managed in the electronic device 100 of FIG. 2 (e.g., the second database scheme DS2 of FIG. 8). For example, a database scheme for the converted user data CUD may be constituted with n fields (e.g., a field "a", a field "c", a field "d", a field "m", and a field "n").

The user data converter 130 may output the converted user data CUD. The converted user data CUD may be provided to the emulator 150 of FIG. 2. Accordingly, the emulator 150 may operate based on the converted user data CUD having a data structure that can be processed by the emulator 150.

Figure 10:
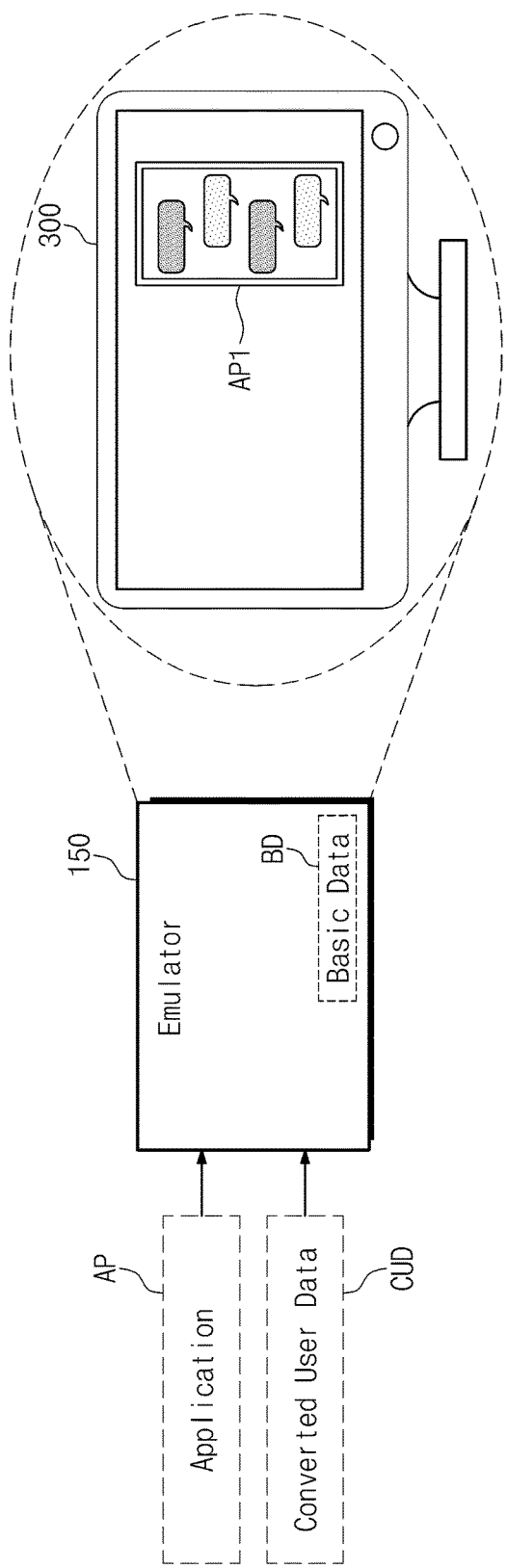
FIG. 10 is a conceptual diagram illustrating a configuration and an operation of an emulator of FIG. 2.

FIG. 10 is a conceptual diagram illustrating a configuration and an operation of an emulator of FIG. 2. FIG. 2 will be referred together with FIG. 10 to help better understanding.

The emulator 150 may imitate (i.e., emulate) an operation of the target device 10. The emulator 150 may provide an operation environment which is identical or similar to an operation environment of the target device 10.

As described above, the application data AP may be obtained from the target device 10 through the data extractor 110. A target application selected from among applications that are installed on the target device 10 may be installed on the electronic device 100 based on the application data AP. The emulator 150 may emulate the execution of the target application.

The emulator 150 may receive the converted user data CUD from the user data converter 130. The emulator 150 may emulate the execution of the target application such that the target application operates using the converted user data CUD. The execution of the target application may be emulated in the emulator 150 to be identical or similar to a case where the target application is executed on the target device 10.

In some example embodiments, the emulator 150 may be implemented to include basic data BD. The basic data BD may include data that is used regardless of the model/type of the target device 10. For example, the basic data BD may include data of a widely used operating system, data of a basically provided application, and/or the like. The basic data BD may be included in the emulator 150 in advance (e.g., in advance before the emulator 150 begins to operate), instead of being received from the target device 10.

However, in some example embodiments, the emulator 150 may be designed to receive data corresponding to the basic data BD from the target device 10. In such example embodiments, the data extractor 110 may further obtain data corresponding to the basic data BD from the target device 10. The data corresponding to the basic data BD may be included in the application data AP and/or the user data UD, or may be obtained separately from the application data AP and the user data UD.

In some example embodiments, the emulator 150 may output a result of the emulation. For example, the emulator 150 may reconstruct an operation of the target device 10 by emulating the execution of the target application based on the converted user data CUD. For example, the forensic system 1000 may further include an output device. The output device may be included in the electronic device 100 or may be provided separately from the electronic device 100. The emulator 150 may output the result of the emulation through the output device that is connected to the electronic device 100.

For example, the output device may include a display device 300. The display device 300 may provide image information to a user of the electronic device 100. When the emulator 150 reconstructs an operation of the target application that may be executed on the target device 10 based on the converted user data CUD, the display device 300 may display a reconstructed operation AP1.

For example, when the target application includes a messenger application and the converted user data CUD includes message data, the reconstructed operation AP1 may display overall contexts such as transmission/reception of messages, contents of the messages, an order of the messages, materials attached to the messages, and/or the like. That is, a user of the electronic device 100 may observe operations based on the result of the emulation as if the target application is executed on the target device 10. In such a manner, an original situation where the user data UD was generated may be reconstructed, and accordingly, forensic analysis may be performed accurately and fast.

In the above examples, the display device 300 has been described. However, the result of the emulation may be provided in various other forms, such as sound information, text information, and/or the like. The above examples are provided to help better understanding and do not limit the present disclosure.

Figure 11:
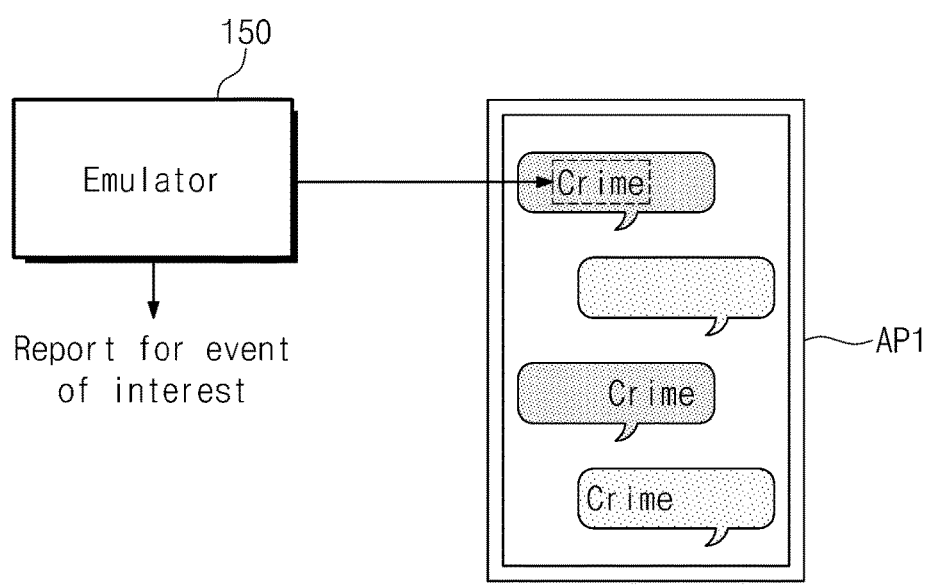
FIG. 11 is a conceptual diagram illustrating a process of collecting data associated with an event of interest by an emulator of FIG. 2.

FIG. 11 is a conceptual diagram illustrating a process of collecting data associated with an event of interest by an emulator of FIG. 2.

The emulator 150 may monitor whether "an event of interest" occurs while the execution of the target application is emulated. Furthermore, the emulator 150 may collect data associated with the event of interest.

Herein, the event of interest may include an event in which a user of the electronic device 100 (e.g., an investigation agency) of FIG. 2 is interested. For example, an investigation agency may be interested in a crime-related call list, message, e-mail, picture, and/or voice, and the event of interest may include a specific call list, a specific word or context, a specific image, and/or a specific voice.

For example, when the target application includes a messenger application and the converted user data CUD includes message data, the reconstructed operation AP1 may show transmission/reception of messages and contents of the messages. Herein, an investigation agency may be interested in a crime-related message. In such a case, the event of interest may include a specific word or context loaded from the converted user data CUD while the execution of the target application is emulated.

For example, an investigation agency may be interested in a word "crime" to perform forensic analysis. In this example, an investigation agency may directly check the appearance of the word "crime" through the reconstructed operation AP1.

In some example embodiments, the emulator 150 may automatically collect data associated with the word of interest "crime". The emulator 150 may trace an event where the word of interest "crime" is loaded from the converted user data CUD while the execution of the target application is emulated. For example, the emulator 150 may count the number of times where the word of interest "crime" occurs. For example, the emulator 150 may capture a context or a paragraph that includes the word of interest "crime" as a text file or an image file.

The emulator 150 may output a report for the event of interest based on the collect data. For example, the report for the event of interest may include data associated with the event of interest, such as the number of times where a word of interest occurs, a context or a paragraph including the word of interest, and/or the like. An investigation agency may easily perform forensic analysis based on the report for the event of interest.

In the above examples, it has been described that the event of interest includes a word of interest. However, according to the purpose, target, and/or scope of forensic analysis, the event of interest may include various other events, such as a call list of interest, an image of interest, a voice of interest, and/or the like. The report for the event of interest may include a variety of information obtained by analyzing a call list, an image, a voice, and/or the like. The above examples are provided to help better understanding, and do not limit the present disclosure.

Figure 12:
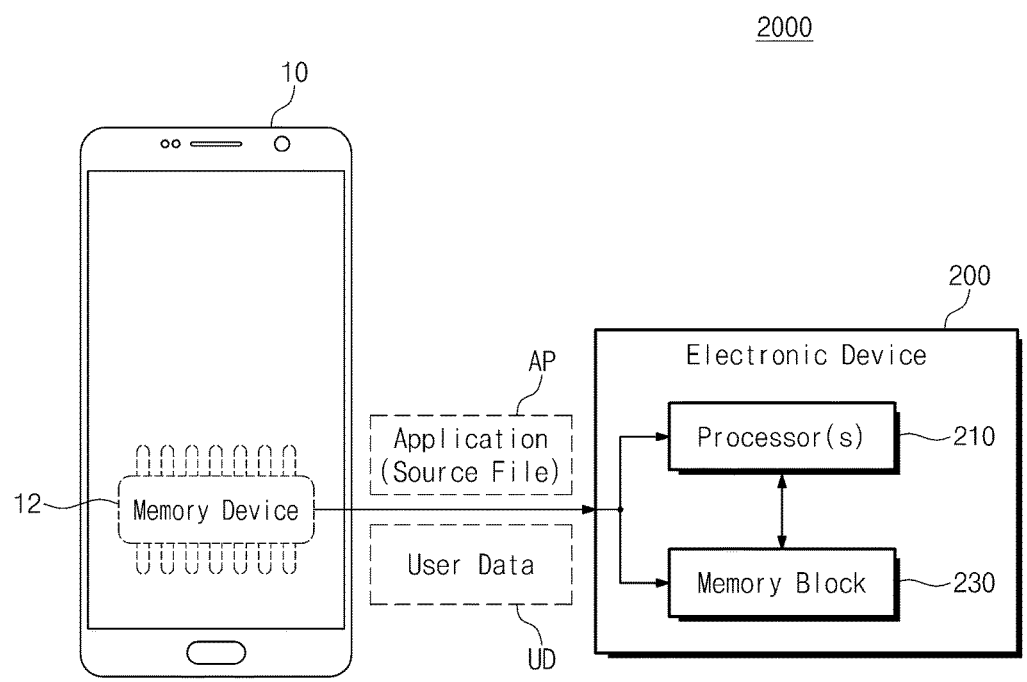
FIG. 12 is a block diagram illustrating a forensic system that includes an electronic device according to some example embodiments.

FIG. 12 is a block diagram illustrating a forensic system that includes an electronic device according to some example embodiments. A forensic system 2000 may include a target device 10 and an electronic device 200.

The target device 10 may include a memory device 12. The target device 10 may be a target of forensic analysis. The target device 10 and the memory device 12 have been described with reference to FIG. 1, thus redundant descriptions will be omitted below for brevity.

The electronic device 200 may be configured to perform forensic analysis on the target device 10. The electronic device 200 may be used to collect a crime-related evidence from the target device 10.

As described with reference to FIG. 2, in some example embodiments, some or all of components of the electronic device 200 may be designed in a software form (e.g., a program code) to perform any intended function(s). In such example embodiments, the electronic device 200 may include one or more processors 210. The electronic device 200 may include one processor (i.e., a single-core system) or a plurality of processors (i.e., a multi-core system).

Each of the processors 210 may have computing power. For example, each of the processors 210 may include a general-purpose processor, a special-purpose processor, and/or an application processor.

The processors 210 may perform various logical operations/arithmetic operations and may process data to perform forensic analysis. For example, under a control of the processors 210, the electronic device 200 may receive application data AP and/or user data UD from the memory device 12 through a reception circuit included in the electronic device 200. By means of the processors 210, a target application may be selected in response to a request from a user of the electronic device 200. Furthermore, by means of the processors 210, the selected target application may be installed on the electronic device 200 based on a source file.

The processors 210 may obtain a list of fields constituting a database scheme managed in the target device 10. Further, the processors 210 may obtain a list of fields constituting a database scheme managed in the electronic device 200 (i.e., a database scheme processed by the processors 210). The processors 210 may convert the user data UD having a data structure according to a database scheme for the target device 10, and thus may generate the converted user data CUD having a data structure according to a database scheme for the processors 210.

Then, by means of the processors 210, the execution of the target application may be emulated. The target application may be executed using files installed based on the source file. The processors 210 may perform various arithmetic operations/logical operations to process instruction sets executed based on the installed files.

By means of the processors 210, the execution of the target application may be emulated such that the target application operates using the converted user data CUD. The processors 210 may provide an operation environment which is identical or similar to an operation environment of the target device 10. The processors 210 may reconstruct an operation of the target device 10.

Under a control of the processors 210, the electronic device 200 may operate substantially identically or similarly to the electronic device 100 of FIG. 2. The processors 210 may provide functions and operations that are substantially identical or similar to those of the data extractor 110, the user data converter 130, and the emulator 150, which have been described with reference to FIGS. 2 to 11. For brevity, detailed descriptions associated with functions and operations of the processors 210 will be omitted below.

The memory block 230 may store data used in the electronic device 200. To this end, the memory block 230 may include one or more memory devices.

For example, the memory block 230 may include one or more nonvolatile memories and/or one or more volatile memories to store data. For example, the memory block 230 may include a nonvolatile memory such as a flash memory, a MRAM, a PRAM, and/or the like. For example, the memory block 230 may include a volatile memory such as a SRAM, a DRAM, a SDRAM, and/or the like.

For example, the memory block 230 may store data processed or to be processed by the processors 210. The memory block 230 may operate as a cache memory or a buffer memory to store data used in operations of the processors 210.

For example, the memory block 230 may store files used to execute the target application. The processors 210 may emulate the execution of the target application by means of the files stored in the memory block 230. The memory block 230 may store the user data UD and/or the converted user data CUD. In the example embodiments, the memory block 230 may store the converted user data CUD based on a data structure according to a database scheme processed by the processor 210. The processors 210 may emulate the execution of the target application by means of the converted user data CUD stored in the memory block 230.

In some example embodiments, the memory block 230 may store data including a result of the emulation. For example, the memory block 230 may store data associated with a report for an event of interest, which has been described with reference to FIG. 11.

However, the above-mentioned examples and the example embodiments are provided to help better understanding of the present disclosure, and are not intended to limit the present disclosure. The example embodiments may be changed or modified variously to convert the user data UD obtained from the target device 10 and to reconstruct an operation of the target device 10 by means of the converted user data CUD.

According to the example embodiments of the present disclosure, an original situation where user data was generated may be reconstructed, thus forensic analysis may be performed accurately and fast. Furthermore, forensic analysis may be performed easily at low cost regardless of the model/type of a target device.

The configuration shown in each of conceptual diagrams is to be understood just from the conceptual point of view. To assist in the understanding of the present disclosure, forms, structures, and sizes of each component shown in each conceptual diagram have been exaggerated or reduced. A configuration actually implemented may have a different physical shape from that shown in each conceptual diagram. Each conceptual diagram is not intended to limit the physical shape of the components.

A device configuration shown in each block diagram is provided to assist in the understanding of the present disclosure. Each block may be formed of smaller blocks according to functions. Alternatively, a plurality of blocks may form a larger block according to a function. That is, the spirit or the scope of the present disclosure is not limited to the configuration shown in a block diagram.

Above, the present disclosure has been described based on some example embodiments. However, the purpose of the present disclosure may be achieved with a different manner from the above example embodiments including the subject matters of the present disclosure according to the nature of the art. Therefore, it should be understood that the above example embodiments are in descriptive and illustrative views, rather than restrictive views. That is, the spirits or the scope that includes the subject matters of the present disclosure and that may achieve a goal of the present disclosure should be included within the spirits or the scope of the inventive concepts of the present disclosure.

Accordingly, a modified or altered technical concept without departing from the scope or the spirit of the present disclosure is included in the scope of the claims below. The scope of the present disclosure is not limited to the above example embodiments.

What is claimed is:

1. An electronic device configured to perform forensic analysis on a target device, the electronic device comprising a non-transitory computer readable storage medium that stores program instructions which, when executed by a processor, function as:
    a data extractor configured to
        obtain, from the target device, a source file of at least one of applications that are installed on the target device, and
        obtain, from the target device, user data that is generated according to the least one of the applications being executed on the target device;
    an emulator configured to emulate an execution of a target application that is installed based on the obtained source file; and
    a user data converter configured to
        convert the obtained user data into converted user data, the obtained user data having a data structure according to a database scheme of the target device, the converted user data having a data structure according to a database scheme of the emulator,
        obtain a list of first fields constituting a database scheme of the target device and a list of second fields constituting the database scheme of the emulator, and
        generate the converted user data such that the converted user data includes an item corresponding to a field, among the list of first fields of the database scheme of the target device, that is identical to one of the list of second fields of the database scheme of the emulator,
    wherein the emulator is configured to emulate the execution of the target application such that the target application operates using the converted user data.

2. The electronic device of claim 1, wherein the user data converter is configured to generate the converted user data such that the converted user data does not include an item corresponding to a field, among the list of first fields of the database scheme of the target device, that is not identical to all the list of second fields of the database scheme of the emulator.

3. The electronic device of claim 1, wherein the emulator includes basic data, the basic data being used regardless of a type of the target device.

4. The electronic device of claim 1, wherein the data extractor comprises:
    a user interface configured to provide selection of the target application from among the applications.

5. The electronic device of claim 1, wherein the target device comprises a mobile communication device.

6. An electronic device configured to perform forensic analysis on a target device, the electronic device comprising:
one or more processors; and
one or more memory devices configured to store data processed or to be processed by the processors, wherein the processors are configured to,
select, in response to a request from a user, at least one application from applications that are installed on the target device;
install, on the memory devices, files used to execute the selected application;
obtain, from the target device, user data generated when the selected application has been executed on the target device;
convert the obtained user data into converted user data, the obtained user data having a data structure according to a database scheme of the target device, the converted user data having a data structure according to a database scheme processed by the processors;
emulate an execution of the selected application such that the selected application operates using the installed files and the converted user data; and
collect data associated with an event of interest, the event of interest occurring while the execution of the selected application is emulated, wherein the event of interest includes a word of interest, the word of interest being loaded from the converted user data while the execution of the selected application is emulated, and collect data associated with at least one of a number of times where the word of interest is loaded or a context including the word of interest.

7. The electronic device of claim 6, wherein the installed files are obtained from at least one of a first storage device or a second storage device, the first storage device being included in the electronic device, the second storage device being provided separately from the electronic device.

8. A method of performing forensic analysis on a target device by an electronic device that comprises one or more processors, the method comprising:

installing, by the processors, a target application on the electronic device based on a source file of at least one of applications that are installed on the target device;

receiving, from the target device through a reception circuit of the electronic device, user data that is generated when the target application is executed on the target device;

obtaining, by the processors, a list of first fields constituting a database scheme of the target device and a list of second fields constituting a database scheme processed by the processors;

converting, by the processors, the received user data into converted user data, the received user data being constituted based on the list of the first fields of the database scheme of the target device, the converted user data being constituted based on the list of the second fields of the database scheme processed by the processors, wherein the converted user data includes an item corresponding to a field, among the list of first fields of the database scheme of the target device, that is identical to one of the list of second fields of the database scheme processed by the processors;

emulating, by the processors, an execution of the target application such that the target application operates using the converted user data; and outputting a result of the emulating through an output device connected to the electronic device.

9. The method of claim 8, wherein outputting the result of the emulating comprises:

reconstructing an operation of the target device by emulating the execution of the target application based on the converted user data.

10. The method of claim 8, wherein the converted user data does not include an item corresponding to a field, among the list of first fields of the database scheme of the target device, that is not identical to all the list of second fields of the database scheme processed by the processors.

* * * * *